United States Patent [19]
Kuznar

[11] Patent Number: 5,197,807
[45] Date of Patent: Mar. 30, 1993

[54] SQUEEZE FILM DAMPER SEAL RING

[75] Inventor: Ronald J. Kuznar, West Chester, Ohio

[73] Assignee: General Electric Company, Cincinnati, Ohio

[21] Appl. No.: 847,879

[22] Filed: Mar. 10, 1992

Related U.S. Application Data

[63] Continuation of Ser. No. 638,582, Jan. 8, 1991, abandoned.

[51] Int. Cl.⁵ .............................................. F16C 27/00
[52] U.S. Cl. ...................................... 384/99; 277/201; 277/220
[58] Field of Search .......................... 384/99, 581, 535; 277/216, 217, 220, 221, 201, 202, 199, 215, 197

[56] References Cited

U.S. PATENT DOCUMENTS

| | | | |
|---|---|---|---|
| 1,522,341 | 1/1925 | Sutton | 277/202 |
| 2,155,259 | 4/1939 | Dickson | 277/201 |
| 4,337,983 | 7/1982 | Hibner | 384/99 |
| 4,669,893 | 6/1987 | Chalaire et al. | 384/99 |
| 4,947,639 | 8/1990 | Hibner et al. | 384/99 X |
| 4,971,457 | 11/1990 | Carlson | 384/99 |

FOREIGN PATENT DOCUMENTS 73648  7/1914  Austria ................................ 277/199

OTHER PUBLICATIONS

"Experimental Measurement of the Dynamic Force Response of a Squeeze Film Damper", Vance & Kirtron, Transactions of the ASME, Nov. 1975, p. 1283.

Primary Examiner—Daniel P. Stodola
Assistant Examiner—William G. Battista, Jr.
Attorney, Agent, or Firm—Jerome C. Squillaro; Charles L. Moore, Jr.

[57] ABSTRACT

A piston ring type seal for squeeze film dampers comprises a hollow oil filled ring structure with transverse inlet and exit orifices to control the flow of squeeze film oil past the ring.

20 Claims, 1 Drawing Sheet

SQUEEZE FILM DAMPER SEAL RING

This application is a continuation of application Ser. No. 07/638,582, filed Jan. 8, 1991, now abandoned.

BACKGROUND OF THE INVENTION

This invention relates to an improved squeeze film damper seal ring and more particularly to a damper seal ring which regulates the flow of oil through a squeeze film damper.

One typical squeeze film damper comprises a rolling element bearing supporting a rotating shaft in a bearing housing of high speed rotary or turbo machinery including hot gas turbine engines such as aircraft gas turbine engines. A bearing support member, for example, the annular race of a rolling element bearing is slidingly fitted in an annular chamber in the bearing housing for limited radial motion therein. The annular race in the annular chamber defines a thin annular squeeze film space between adjacent inner and outer circumferential surfaces of the chamber and race respectively, and a damper fluid such as an oil under pressure is introduced into the squeeze film space to provide a damping action on radial motion of the race and shaft. The annular squeeze film space is sealed by means of a spaced apart pair of gap piston ring seals fitted in grooves in the race and engaging the opposite circumferential wall of the annular chamber. Damper oil from the squeeze film space which passes by the rings in controlled amounts is collected in an appropriate sump and treated, usually cooled if necessary, and recirculated through the damper. Controlled oil flow through or past the rings is an important operating factor in squeeze film dampers. High pressure, high velocity damper fluid flow through small ring spaces into a low pressure ambient region external to the damper results in disruption of the oil film in the squeeze film space, together with air entrainment in the squeeze film with a concurrent loss of damper effectiveness.

OBJECTS OF THE INVENTION

Accordingly, it is an object of this invention to provide an improved damper ring seal for squeeze film dampers.

It is another object of this invention to provide an improved damper ring seal for squeeze film dampers in which the damper ring seal includes oil flow regulating characteristics to control oil flow past the piston ring seal.

It is a further object of this invention to provide a damper ring seal for squeeze film dampers in which the piston ring is utilized as an oil reservoir in connection with the flow of oil past the seal.

It is yet another object of the invention to provide an oil filled damper ring seal which functions as a pair of seals in a squeeze film damper.

It is another object of this invention to provide an improved piston ring seal for squeeze film dampers in which oil flow orifices in the ring regulate oil flow past the ring to minimize squeeze film disruption.

SUMMARY OF THE INVENTION

In a squeeze film damper, piston ring seals are replaced with hollow oil filled circular or rectangular cross-section ring structures which include offset lateral entrance and exit orifice apertures to regulate squeeze film oil flow past the rings.

This invention will be better understood when taken in connection with the following drawings and description.

DESCRIPTION OF PREFERRED EMBODIMENTS

Figure 1:
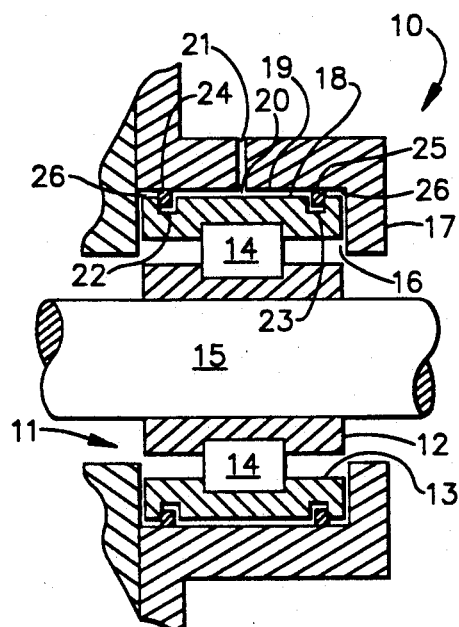
FIG. 1 is a partial schematic and cross-sectional view of a squeeze film damper.

Referring now to FIG. 1, a typical squeeze film damper assembly 10 is combined with a rolling element bearing 11. Bearing 11 comprises an inner race 12 and a spaced outer bearing support or race 13 with rolling elements 14 therebetween. Inner race 12 is fitted on a shaft 15 which may be the principal shaft of high speed turbo machinery such as a hot gas turbine engines, for example, an aircraft gas turbine. Annular outer race 13 of bearing 11 is fitted within an annular chamber 16 of bearing housing 17 for limited radial motion therein. The outer circumferential surface 18 of race 13 is closely adjacent an inner circumferential surface 19 of annular chamber 16 to define a thin annular squeeze film space 20 therebetween. Damper fluid such as oil, under pressure, is introduced into squeeze film space 20 through an oil inlet 21. A shaft/rotor or shaft/turbine imbalance may cause shaft 15 and its bearing assembly 11 to undergo radial and orbital or eccentric motion causing race 13 to exert a compressive force on the oil in squeeze film space 20 to cause viscous flow of oil and a damping action on the race.

In order to seal oil in squeeze film space 20 a pair of spaced apart piston ring type seals are employed to contain the squeeze film space therebetween. As illustrated in FIG. 1, outer race 13 includes a pair of concentric grooves 22 and 23 in its outer circumferential and planar surface 18. Gap piston rings 24 and 25 are fitted in grooves 22 and 23, respectively, and engage the groove sidewalls as well as circumferential surface 19 to seal off squeeze film space 20 between rings 24 and 25. Ordinarily any damper oil flow from squeeze film space 20 past rings 24 and 25 is carefully regulated and controlled to maintain appropriate pressure conditions in squeeze film space 20 and to prevent entry of air into squeeze film space 20. A gap piston ring may be described as a rectangular cross-section metal strip in a circle configuration with the ends of the strip in spaced abutting relationship as the defined gap. The size of the gap is predetermined to pass a programmed oil flow depending on such factors as squeeze film thickness and necessary heat dissipation.

As noted with respect to FIG. 1, oil in squeeze film space 20 is subjected to very high pressure while the external damper regions 26 on opposite sides of the rings from squeeze film space 20 are usually at a significantly lower or ambient pressure. The noted regions may be referred to as sump regions which are connected to an oil sump (not shown), and sump oil passing by the sealing rings is collected in the sump for treatment and recirculation. A piston ring gap may cause a disruption of the oil film in space 20 and reduce damper effectiveness. Disruption is caused by a jet effect from high pressure in squeeze film space 20 forcing oil to exit at high velocity through a small ring gap into a low pressure region such as an adjacent region 26 with an immediate pressure drop because of the direct communication through the ring gap into a low pressure sump region 26 on the opposite side of a ring. Such conditions result in disruption of the damper oil film and air entrainment in the oil in squeeze film space 20 with associated loss of damper effectiveness. The foregoing problems are ameliorated or minimized by the use of an improved reservoir ring of the present invention. One such reservoir ring is illustrated in FIG. 2.

Figure 2:
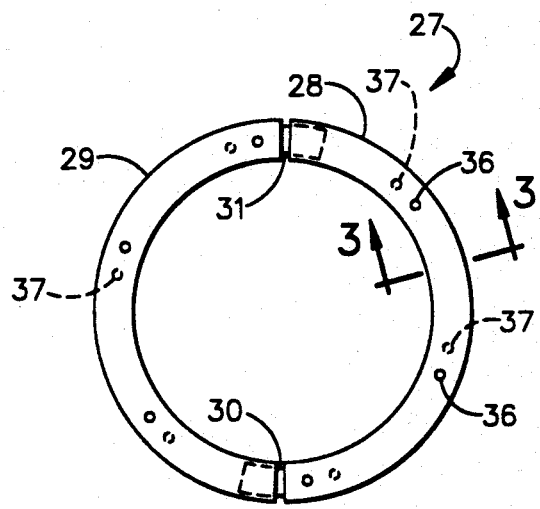
FIG. 2 is a plan view of an improved piston ring or damper ring seal of this invention.

Referring now to FIG. 2, a reservoir ring 27 comprises a 360° hollow rectangular structure formed from a pair of appropriately joined 180° arc or half circle sections 28 and 29. One or both, and preferably both ends of each section 28 and 29 are formed as part of a slip joint so that the two sections 28 and 29, when joined as illustrated, define slip joints 30 and 31 which function in the usual manner of permitting some expansion and contraction of ring 27 as well as accommodating damper design tolerances and varying operating conditions. A ring 27 with an appropriate groove may be substituted for rings 24 and 25 of FIG. 1. The reservoir feature of ring 27 is illustrated in FIG. 3 which is a cross-sectional view of ring 27 taken along the line 3—3 of FIG. 2.

Figure 3:
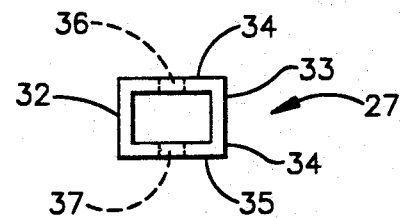
FIG. 3 is a cross-sectional view of the ring of FIG. 2 taken along the line 3—3 of FIG. 2.

In FIG. 3, ring 27 includes a hollow rectangular cross-section with inner and outer circumferential walls 32 and 33 and sidewalls 34 and 35. Sidewall 34 which is the sidewall adjacent squeeze film space 20 includes a plurality of circumferentially spaced inlet orifice apertures 36. Orifices 36 are transverse orifices, being directed into sidewall 34 of ring 27 in a direction transverse to the plane of the ring. The location of orifices 36 in ring 27 place them in open fluid flow communication with damper space 20 and permit high pressure oil from squeeze film space 20 to directly enter ring 27. Orifices 36 are of a larger size which does not support a local jet effect. Also, potential jet effects are minimized by ring 27 having a hollow cross-section filled with damper oil which will accommodate and mollify any jet effect.

Controlled oil flow from ring 27 is provided by means of a plurality of exit orifices 37 in the opposite sidewall 35 of ring 27, being the side opposite from squeeze film space 20. In this connection orifices 37 are the controlling orifices of the ring seal and are sized to limit oil flow therethrough. Accordingly orifices 37 are described as metering orifices whereas orifices 36 are sized to accommodate excess oil flow and pressure from squeeze film space 20 without any jet effect. Any jet effect from orifices 37 would have substantially negligible effect on the oil film in squeeze film space 20 which is not in direct communication with either orifices 37 or the opposite sump region 26 (FIG. 1).

As illustrated in FIG. 3, exit orifices 37, (and also entrance orifices 36) may be described as a concentric circle row of orifices. However, one of the circles is rotated with respect to the opposite circle so that, for example, inlet orifices 36 and exit orifices 37 are in circumferential offset relationship to each other in order that opposite orifices do not provide an aligned oil flow channel or direct flow path between squeeze film space 20 and the opposite side or sump region 26 (FIG. 1) of the ring. Furthermore, inlet and exit orifices may not be equidistantly circumferentially spaced around the ring sidewall but may be correlated, in size, spacing, and location, to the distribution of damper fluid pressure around the ring. Any direct communication between high pressure oil in squeeze film space 20 and the sump or ambient region of the damper is interdicted by the volume of oil in the reservoir ring. The volume of oil in ring 27 may have some damper design correlation with the volume of squeeze film space 20 so that the desired fluid flow and pressure transition between the squeeze film space and the sump regions are maintained.

An oil reservoir ring may have various other cross-sectional configurations to provide similar advantages. One such other modification is shown in FIGS. 4 and 5 as a circular cross-section ring.

Figure 4:
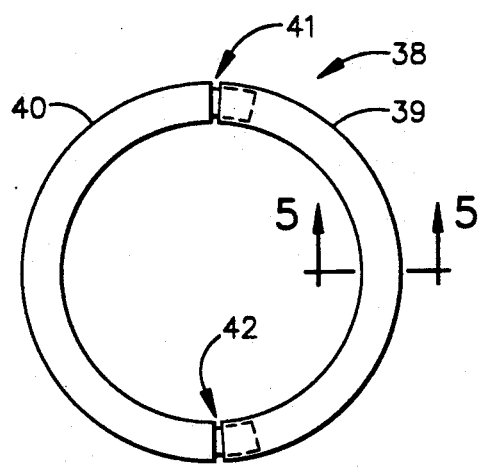
FIG. 4 is a plan view of a further hollow cross-section ring of this invention.

Referring now to FIG. 4, a 360° hollow seal ring 38 comprises, similarly to ring 27 of FIG. 2, a pair of 180° sections 39 and 40, each with half slip joint ends 41 and 42. Sections 39 and 40 are joined by means of slip joints 41 and 42 to provide a 360° ring without an end gap. However, ring 38 may also comprise a greater number of arc sections which interfit to provide a 360° ring. The half joint ends of each section 39 and 40 may be the same half joint as illustrated in FIG. 4, or alternate, e.g. male-female ends. The hollow structure of ring 38, together with its oil inlet and exit orifices, is best described with respect to its enlarged cross-sectional view in FIG. 5.

Figure 5:
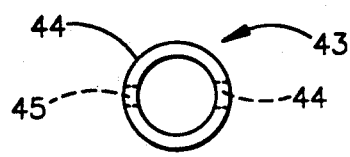
FIG. 5 is a cross-sectional view of the ring of FIG. 4 taken along the line 5—5 of FIG. 4.

Referring now to FIG. 5, cross-section 43 of ring 38 is described as closed circular with larger transverse entrance orifices 44 and smaller exit orifices 45. Orifices 44 and 45 act in a similar manner as their counterpart orifices 36 and 37 of FIG. 4. A ring 38 is utilized in the FIG. 1 damper as a replacement for each prior ring 24 and 25 to effectively seal squeeze film space therebetween and control oil flow from damper 10 during normal operation of the damper. Such a substitution is illustrated in FIG. 6.

Figure 6:
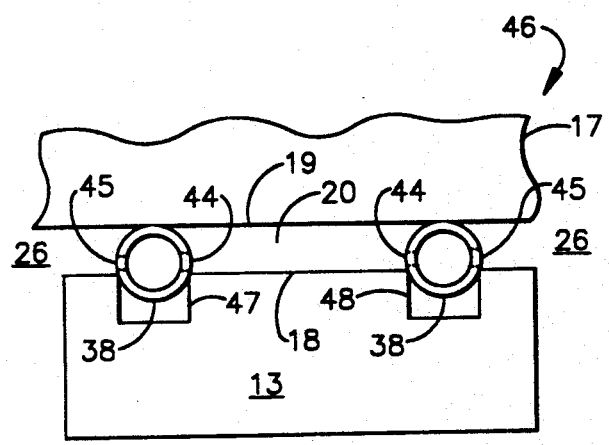
FIG. 6 is a partial cross-sectional view of the ring of FIGS. 4 and 5 in a squeeze film damper application.

Referring now to FIG. 6 a squeeze film region 46 of a squeeze film damper such as damper 10 of FIG. 1 comprises similarly an outer race 13 of a rolling element bearing with spaced apart concentric grooves 47 and 48 therein. A ring 38 (FIG. 4) of this invention resides in each groove 47 and 48 so that entrance orifices 44 (FIG. 5) are exposed in fluid flow communication with squeeze film space 20 while exit orifices 45 (FIG. 5) lead to external regions 26 of the damper. As illustrated, the O.D. of the ring 38 cross-section is somewhat larger than the width of its groove so that rings 38 are not fully recessed in their grooves. The fit of rings 38 together with their ring structure and circular cross-section provide the required flexibility and peripheral sealing contact with circumferential wall 19 of housing 17.

This invention provides a piston ring type seal particularly for squeeze film dampers where the ring is a hollow oil filled structure with inlet orifices in fluid flow communication with the oil film in the damper squeeze film space and outlet metering orifices leading to an exterior sump region of the damper. Inlet orifices are sized to permit oil flow from the squeeze film region into the hollow ring without disruption of the high pressure oil film while the exit orifices are sized to provide the desired flow through the ring during damper operation. Accordingly, in its broadest form, this invention comprises a contained volume of oil between a squeeze film damper space and a sump region. The contained volume receives oil from the squeeze film damper space and dispenses it into a sump region. A preferred contained volume is a hollow ring structure which, as illustrated in FIGS. 2 and 4, comprises a pair of metallic arc segments with interfitting slip joints to provide a full circle ring with some expansion and contraction characteristics. However, depending on elasticity or flexibility of the ring material and dimensions of the ring, a single slip joint may suffice for the ring. Furthermore, ring material may be chosen from various appropriate metals and non-metals including synthetic rubber materials. In the latter instance a rubber material reservoir O ring may be fitted in the noted grooves and not require slip joints.

The hollow oil filled structure acts in the nature of a pair of seals in series for the squeeze film space. One seal comprises the actual contact of a ring with its groove walls and opposite chamber wall. The other seal comprises the volume of oil in the hollow ring with a metering orifice outlet providing a controlled leakage seal.

While this invention has been disclosed and described with respect to preferred embodiments thereof, it will be understood by those skilled in the art that various modifications and changes may be made without departing from the spirit and scope of the invention in the following claims.

What is claimed:

1. In a squeeze film damper in which a rotary bearing supported shaft has an annular bearing support fitted in an annular chamber in a bearing housing for limited radial motion therein, and where the annular bearing support and an opposed circumferential wall of said annular chamber define a thin annular squeeze film space therebetween adapted to be filled with damper oil, the improvement comprising:
   (a) said annular bearing support having a pair of spaced apart concentric grooves in its outer surface with said squeeze film space between said grooves,
   (b) a 360° ring seal in each of said grooves,
   (c) said 360° ring seal comprising a hollow cross-section ring structure,
   (d) said hollow ring structure having a plurality of transverse oil entrance orifices therein in a side wall adjacent said squeeze film space and in direct fluid flow communication with said squeeze film space,
   (e) said hollow ring seal structure having a plurality of transverse metering outlet orifices therein leading to a sump region, said outlet orifices being formed in a side wall opposite to said side wall adjacent said squeeze film space; and
   (f) a volume of oil contained within said hollow cross-section ring structure, said volume of oil having a damper design correlation with a volume of the squeeze film space to cause a desired oil flow rate and pressure transition between the squeeze film space and said sump region.

2. The invention as recited in claim 1 wherein said inlet transverse orifices are circumferentially spaced apart around said ring seal.

3. The invention as recited in claim 1 wherein said transverse metering outlet orifices are circumferentially spaced apart around said ring.

4. The invention of claim 1 wherein said inlet and outlet transverse orifices are circumferentially offset with respect to each other to prevent any transversely aligned oil flow channel therebetween.

5. The invention as recited in claim 1 wherein said entrance orifices are larger than said exit orifices.

6. The invention as recited in claim 1 wherein said ring seals and said grooves have rectangular cross-sections.

7. The invention as recited in claim 1 wherein said 360° ring seal comprises
   (a) a pair of 180° arc sections,
   (b) a slip joint connector at each end of said arc sections,
   (c) said 180° arc sections being fitted together by said slip joints in a 360° ring.

8. The invention as recited in claim 1 wherein said ring seal has a circular cross-section and said grooves have a rectangular cross-section.

9. The invention as recited in claim 8 wherein the diameter of said ring seal cross-sections is greater than the width of said grooves.

10. The invention as recited in claim 1 wherein said hollow ring structure comprises a metal.

11. The invention as recited in claim 1 wherein said hollow ring structure comprises a non-metal.

12. The invention as recited in claim 1 wherein said hollow ring structure comprises a synthetic rubber material.

13. In a squeeze film shaft damper in which a rotary bearing supported shaft has an annular bearing support fitted in an annular chamber formed in a bearing housing, the annular bearing support and an opposed circumferential wall of the annular chamber being spaced from one another to define a thin annular squeeze film space therebetween for containing a damper fluid, the improvement comprising:
   a pair of spaced fluid reservoir means each having a hollow interior for containing a volume of damper fluid, each reservoir means being disposed between the annular squeeze film space and a sump region;
   a plurality of entrance orifices formed in each of said fluid reservoir means for permitting fluid flow from the squeeze film space into each fluid reservoir means at a substantially undisrupted pressure;
   a plurality of exit orifices formed in each of said fluid reservoir means adjacent to said sump region for metering a desired fluid flow rate and pressure transition of the fluid between the squeeze film space and said sump region; and
   said volume of contained fluid within each fluid reservoir means acts to interdict direct fluid flow between the squeeze film space and said sump region to minimize excess loss of damper fluid in the squeeze film space with a concurrent loss of damper effectiveness.

14. The invention of claim 13, wherein each of said fluid reservoir means is an annular ring seal having a hollow interior for containing said volume of fluid.

15. The invention of claim 14, wherein said plurality of entrance orifices are formed in a side wall of each ring seal adjacent to the squeeze film space and each circumferentially spaced apart around each ring seal; and
   said plurality of exit orifices are formed in a side wall of each ring seal and each circumferentially spaced apart around each ring seal.

16. The invention of claim 15, wherein said entrance orifices are circumferentially offset relative to said exit orifices to prevent any transversely aligned oil flow channel therebetween.

17. The invention of claim 15, wherein said entrance and exit orifices are each respectively sized and distributed around each of said ring seals in response to an expected distribution of damper fluid pressure around said ring seal.

18. In a squeeze film shaft damper in which a rotary bearing supported shaft has an annular bearing support fitted in an annular chamber formed in a bearing housing, the annular bearing support and an opposed circumferential wall of the annular chamber being spaced from one another to define a thin annular squeeze film space therebetween for containing a damper fluid, the improvement comprising:

a pair of annular ring seals each disposed on opposite sides of the squeeze film space and between the squeeze film space and a sump region, each of said ring seals having a hollow interior;

a plurality of entrance orifices formed in a side wall of each ring seal adjacent to the squeeze film space and circumferentially spaced apart around each ring seal;

a plurality of exit orifices formed in an opposite side wall of each ring seal adjacent to said sump region and circumferentially spaced apart around each ring seal said exit orifices being sized relative to said entrance orifices to control damper fluid flow between the squeeze film space and said sump region; and a volume of damper fluid contained within each ring seal to interdict direct fluid flow between the squeeze film space and said sump region to minimize excess loss of damper fluid in the squeeze film space with a concurrent loss of damper effectiveness.

19. The invention of claim 18, wherein said entrance and exit orifices are circumferentially offset relative to each other to prevent any transversely aligned oil flow channel therebetween.

20. The invention of claim 18, wherein said entrance and exit orifices are each respectively sized and distributed around each of said ring seals in response to an expected distribution of damper fluid pressure around said ring seal.

* * * * *